United States Patent Office 3,087,314
Patented Apr. 30, 1963

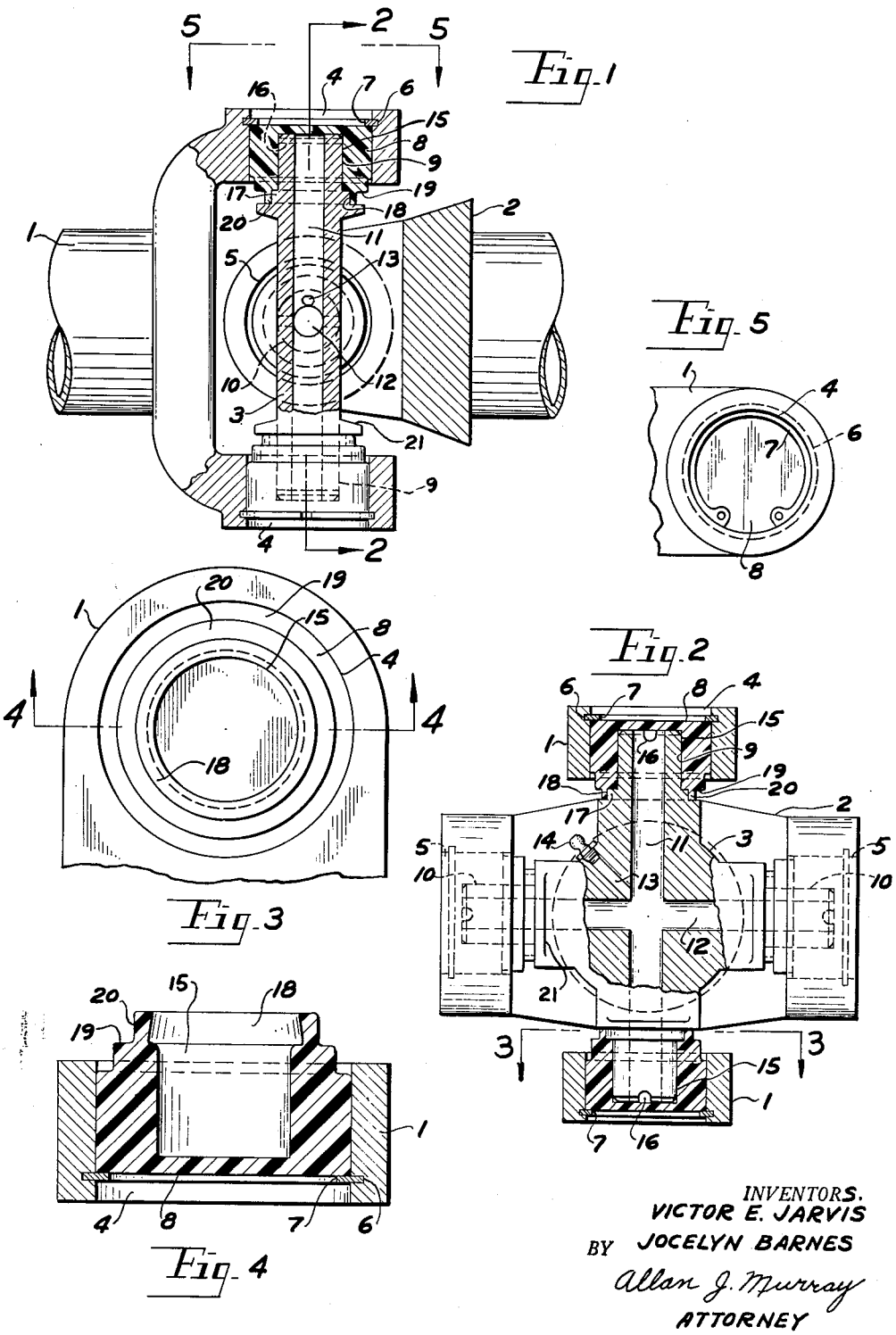

3,087,314
UNIVERSAL JOINT
Victor E. Jarvis, Northville, and Jocelyn Barnes, Detroit, Mich.
Filed Apr. 12, 1961, Ser. No. 102,612
4 Claims. (Cl. 64—17)

This invention relates to universal joints, and especially to joints of the type having a driving yoke and a driven yoke interconnected by and pivotal upon a coupling.

In wide spread use today is a form of such joint wherein each yoke is formed with two aligned holes in each of which is carried cup bearings, socketed, and having the socket's walls lined with needle bearings. The coupling is formed with two transversely elongated pairs of oppositely projecting trunnions, each trunnion being rotatably received by a socketed bearing in one of the respective yokes.

It is present practice to make the socketed cup bearing of steel, entailing expensive machining of the exterior circumferential surface and of the socket, plus manufacture and insertion of needle bearings. In some installations, the coupling is formed with a reservoir for extra lubricant. It is necessary to prevent escape of this lubricant under centrifugal force, as hereinafter explained. This requires addition of rubber sealing elements, each mounted on a cup-bearing and engaging an annular shoulder formed on each trunnion.

An object of this invention is to provide a universal joint wherein said trunnions are each rotatably received in a one-piece bushing formed with a socket having its opening adapted to embrace the annular shoulder of said trunnion and prevent said escape of lubricant.

Another object is to form at said opening an annular recess to receive said annular shoulder.

Another object is to form an end portion of said bushing with a reduced diameter, such portion corresponding to the recess, and thus leaving a lip at the marginal portion of the opening to embrace said annular shoulder.

Another object is to incline the circumferential face of the recess toward the socket center from the maximum depth of the recess to the end face of the socket so that the lip must distend slightly when forced over the shoulder of the trunnion and said circumferential face is in substantially constant engagement with the circumferential face of the shoulder.

These and various other objects are achieved by the construction hereinafter explained and illustrated in the accompanying drawing, wherein:

FIG. 1 is a view of the universal joint in partial section on the line 1—1 of FIG. 2.

FIG. 2 is a view of the universal joint in partial section on the line 2—2 of FIG. 1.

FIG. 3 is a view in section on the line 3—3 of FIG. 2 omitting a trunnion.

FIG. 4 is a view in section on the line 4—4 of FIG. 3, also omitting a trunnion.

FIG. 5 is a view on the line 5—5 of FIG. 1.

In these views, the reference character 1 designates a driving yoke and 2 a driven yoke (in a reversible drive, this relationship could at times be reversed). A coupling 3 interconnects the yokes, as clearly seen in FIGS. 1 and 2. Said yokes are respectively formed with a pair of aligned holes 4 and 5. Said holes are each formed with an annular groove 6 which receives a split lock ring 7 to resist undesired escape from said holes of bushings 8.

The coupling 3 is formed with two transversely elongated pairs 9 and 10 of oppositely projecting trunnions to form a reservoir for lubricant. A hole 11 is drilled through the coupling and trunnions 9 on the rotational axis of said trunnions 9. A second such hole 12 is drilled through the coupling and trunnions 10 on the rotational axis of said trunnions 10. As is clearly seen in FIGS. 1 and 2, said holes 11 and 12 intersect at the center of the coupling and a smaller hole 13 opens into such intersection. Thus, a lubricant may be admitted through a fitting 14 of any conventional type, and the holes 11 and 12 filled with such lubricant.

Each bushing 8 is formed with a socket 15 which receives a trunnion 9 or 10. The trunnions, of course, must be rotatably mounted in said sockets and to facilitate such movement a lubricant, flowing from the holes 11 and 12 under urging of centrifugal force when the joint rotates, finds passage through grooves 16 formed on the outer end of each trunnion. The tolerance with which each trunnion fits in its socket is such that the pressure of lubricant being forced outwardly by centrifugal force, causes lubricant already at the outer ends of the holes 11 and 12 to flow between the wall of the socket and the circumferential face of the trunnion. Lubricant thus flowing would escape freely from the socket if not hindered.

The described and illustrated coupling requires a seal to resist such escape of reserve lubricant. To afford a seal which will resist such escape, each trunnion is formed with an annular shoulder 17, and each socket 15 is formed at its opening with an annular recess 18 which receives and embraces said shoulder tightly enough to minimize escape of the lubricant.

Exteriorly the bushing is formed with a reduced diameter corresponding in its position with the recess to leave an annular lip 20 which embraces the annular shoulder as described. As best seen in FIG. 4, the circumferential face of the recess 18 inclines toward the center of the socket to leave a rounded edge at the socket opening. The described inclination of said circumferential face is sufficiently slight, and the material of the bushing has sufficient resilience, that the lip is distended when the rounded edge is forced upon said annular shoulder 17, bringing said circumferential face in substantially full contact with the circumferential face of said shoulder.

For rapidity, simplicity, and economy of manufacture, it is preferred to form the bushing 8 of suitable plastics or other materials readily formed and having the desired resilience.

As clearly disclosed in FIGS. 1 and 2, the coupling 3 has oppositely projecting arcuate flanges 21 remaining from the machining of the trunnions 9, 10 and annular shoulders 17. Such flanges afford contact with the full annular extent of the end face of the lips 20.

What we claim is:

1. A universal joint including a driving yoke and a driven yoke, a coupling interconnecting said yokes, trunnions projecting from the coupling for engagement by the respective yokes, holes formed in the yokes to afford said engagement, each trunnion being formed with an annular shoulder, bushings received in the respective holes, said bushings being formed with sockets opening in an end thereof to rotatably receive said trunnions, each socket having an annular recess marginally of the socket opening to form an annular shoulder interiorly of the socket, and the circumferential face of said recess being inclined, from said annular shoulder to said socket opening, toward the center of said socket, whereby the end portion of the bushing distends at said socket opening upon said annular shoulder to bring the circumferential face of the socket into substantially full engagement with the circumferential face of said shoulder.

2. A universal joint including a driving yoke and a driven yoke, a coupling interconnecting said yokes, trunnions projecting from the coupling for engagement by the respective yokes, holes formed in the yokes to afford said engagement, each trunnion being formed with an annular shoulder, bushings received in the respective holes, said bushings being formed with sockets opening in an end thereof to rotatably receive said trunnions, and the opening of each socket having an annular recess formed marginally of the socket opening to embrace said annular shoulder and resist escape of lubricant from the socket.

3. In a universal joint as set forth in claim 2, an end portion of said bushing being reduced in diameter, said portion corresponding in position and extent to that of the recess, whereby an annular lip is formed to embrace said annular shoulder.

4. A universal joint as set forth in claim 3, said annular recess forming an annular shoulder interiorly of the socket, and the circumferential face of said recess being inclined, from said annular shoulder to said socket opening, toward the center of said socket, whereby said lip distends at said socket opening upon said annular shoulder to bring the circumferential face of the socket into substantially full engagement with the circumferential face of said shoulder.

References Cited in the file of this patent

UNITED STATES PATENTS

| | | |
|---|---|---|
| 1,943,814 | Cutting | Jan. 16, 1934 |
| 2,027,078 | Warner | Jan. 7, 1936 |
| 2,896,433 | Hempel | July 28, 1959 |
| 2,992,547 | Rabson | July 18, 1961 |

FOREIGN PATENTS

| | | |
|---|---|---|
| 1,089,630 | France | Mar. 21, 1955 |
| 1,152,458 | France | Feb. 18, 1958 |